Figure 1:
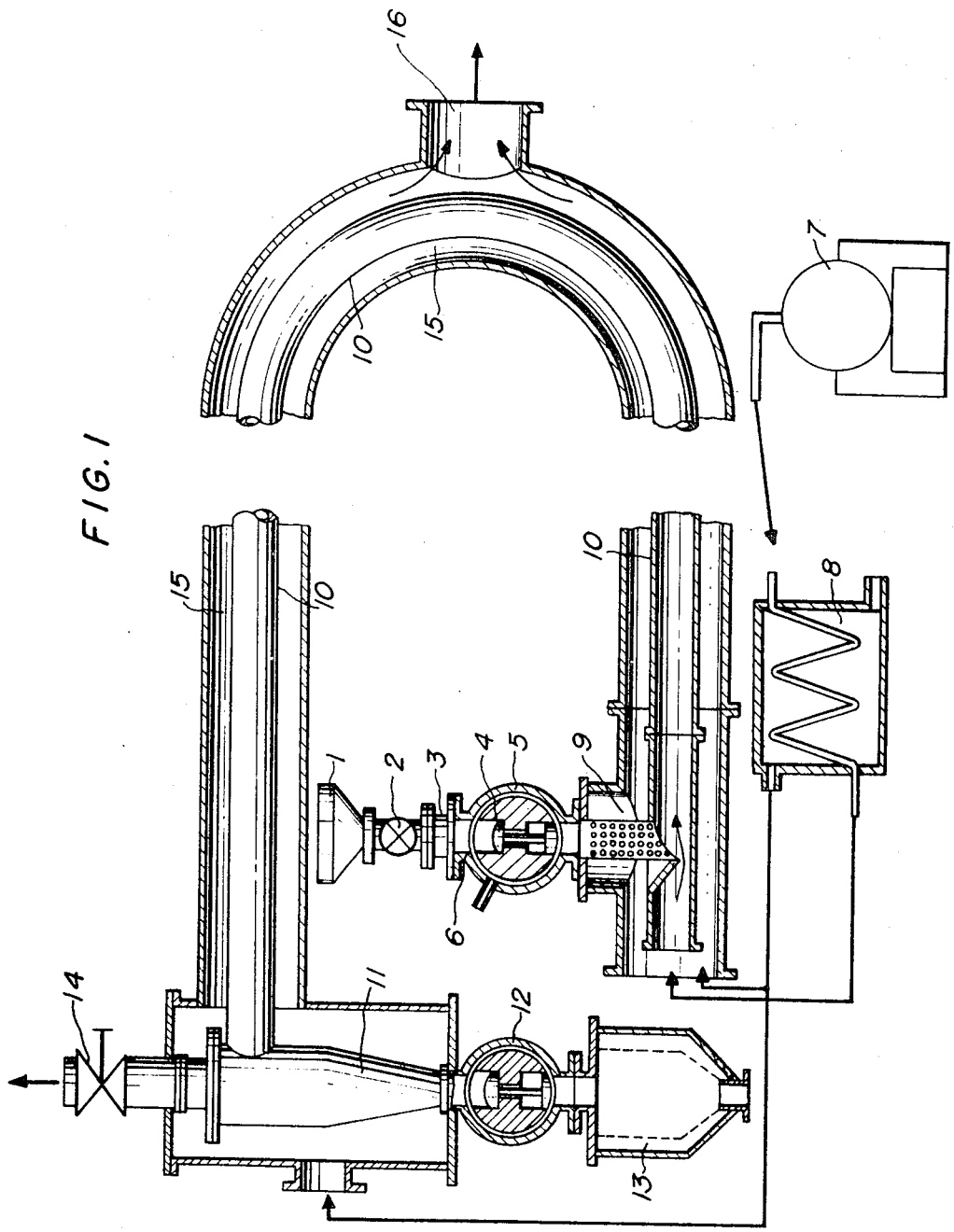

United States Patent
Toei et al.

[15] 3,661,071
[45] May 9, 1972

[54] APPARATUS FOR PRODUCING EXPANDED FOOD STUFFS BY GASEOUS CONVEYING HEATING

[72] Inventors: Ryozo Toei, Kyoto; Tatsuo Aonuma, Kashiwa-shi; Hiroharu Watanabe; Toshizumi Yuasa, both of Noda-shi, all of Japan

[73] Assignee: Kikkoman Shoyu Co., Ltd., Noda-shi, Japan

[22] Filed: June 13, 1969

[21] Appl. No.: 833,043

[30] Foreign Application Priority Data

Oct. 1, 1968  Japan...................................43/70808

[52] U.S. Cl. ...............................................99/238 R, 99/81
[51] Int. Cl. .........................................................A231 1/18
[58] Field of Search ..................99/238, 238.1, 238.5, 238.6, 99/237, 81; 92/1

[56] References Cited

UNITED STATES PATENTS

| | | | |
|---|---|---|---|
| 3,094,059 | 6/1963 | Graham | 99/238 |
| 3,128,690 | 4/1964 | Maehl | 99/238 |
| 3,202,084 | 8/1965 | Hale | 99/238 |

*Primary Examiner*—Robert W. Jenkins
*Attorney*—Cushman, Darby and Cushman

[57] ABSTRACT

A method of continuously producing an expanded food stuff, which comprises entraining a material food stuff in a pressurized heated gas stream in a suspended condition, thereby heating and conveying said material, and then discharging the heated material into a gas atmosphere at a lower pressure, whereby said material is expanded.

An apparatus for practicing the above-described method, which comprises a conduit for flowing a pressurized heated gas therethrough, means for introducing a material food stuff into the stream of said gas in a suspended condition to be entrained therein, means for collecting the heated material and means for discharging the heated material abruptly into a gas atmosphere at a lower pressure thereby to expand said material.

2 Claims, 2 Drawing Figures

APPARATUS FOR PRODUCING EXPANDED FOOD STUFFS BY GASEOUS CONVEYING HEATING

The present invention relates to a method and apparatus for continuously uniformly expanding materials (e.g. polished rice, glutinous rice, etc.) which are readily gelatinized by heat the, therefore, tend to adhere to and harden on the wall of a heating equipment in which they are heated or tend to form an agglomerate with the particles thereof bonded with each other, materials (e.g. vegetables, fruits, fish and shellfish) which are sensitive to heat and materials of uneven grain size (wide grain size distribution) in particular, not speaking of the ordinary granular or granular food stuff materials.

The primary object of the present invention is to heat the above-mentioned materials of food stuffs uniformly and thereby expand the same efficiently in a short period of time.

The method of producing an expanded food stuff according to the present invention comprises passing a pressurizing and heating gas, e.g. a pressurized superheated steam, at a pressure of 3 – 15 kg/cm²G and a temperature of 100° – 300° C. through a heating conduit, mixing a material with said gas by continuously introducing said material into the gas stream, whereby the material is heated in a very short period of time (within 10 seconds) while being entrained in said gas stream, thereafter collecting the material by a cyclone or the like and discharging the pressurized and heated material continuously abruptly into a gas atmosphere maintained at a lower pressure thereby to expand said material.

In the process of producing an expanded food stuff heretofore, the so-called indirect-heating method has been employed for heating the material food stuff, in which the material is heated by charging it in a closed cylindrical pressure container or the so-called puffing gun which is heated externally by a gas burner or the like while being rotated. With this method, however, it is impossible to uniformly heat all particles of the material and the yield of the product is markedly lowered due to scorching or insufficient heating. In addition, since the material is in contact with the wall and also each other, the particles adhere to the wall of the container or to each other and harden in that state where the material has a particularly large amount of free water or the surface starch of the material is readily gelatinized, thus making it impossible to obtain a satisfactory result of the treatment.

In another method used for heating a material, the material is placed in the aforesaid container or a container provided therein with means for mechanically stirring or transporting the material and heated therein by means of a heating medium, e.g. a pressurized heating gas, blown thereinto. This method is superior to the preceding method in respect of heat transfer efficiency and thermal efficiency but still inevitably involves the above-mentioned trouble due to contact of the material particles with each other.

There has also been proposed a method (U.S. Pat. application Ser. No. 537,730, now U.S. Pat. No. 3,456,575) which is the so-called fluidized bed heating method and in which a material is fed into a closed pressure container to form a fluidized bed on an apertured plate disposed in said container and heated in the fluidized state with a gaseous heating medium blown upwardly through the apertures in said apertured plate. This method is far superior to the preceding two methods in respect of thermal efficiency and heat transfer efficiency and in that the material particles are heated in a dispersed condition, but is not adapted for use in the expansion of such a material which contains a relatively large amount of water providing for ready gelatinization of the starch thereof or which is sensitive to heat and consists of particles of uneven particle size.

The above-described problems possessed by the conventional methods and apparatus for expanding food stuffs have been solved easily by the method and apparatus according to the present invention.

Namely, the present invention has the following advantages:

1. Since a gas stream is used as heating medium, the coefficient of heat-transfer between a material to be heated and the heating medium is extremely large (or the heat-transfer speed is very high) and, therefore, a heat-expansion treatment can be accomplished in a very short period of time. Practically speaking, an expansion treatment of the ordinary cereals can be accomplished only within 10 seconds when they are heated by a heating medium at a pressure of 5 – 15 kg/cm²G and a temperature of 200° – 250° C., as contrasted to a retention time of at least 1 minute or longer in case of the conventional expanding method and apparatus.

2. Since a material is intensely stirred and dispersed, not mechanically but by the eddy flow of a gaseous heating medium, the particles of the material are brought into contact with the apparatus wall or with each other much less frequently during the period in which the material resides in the apparatus. Therefore, a treatment of even such a material which has been agglomerated and hardened (into blocks) due to the free water or the surface starch of which is readily gelatinized by heat or which has a relatively large amount of free water (e.g. polished rice, vegetables, fruits, etc.) can be performed with ease.

3. The heating time can be varied freely by changing the flowing velocity of a gaseous heating medium. With a constant velocity of a gas stream, the transport velocity of a given material is determined by the physical properties of said material, such as the particle size, water content and shape of the material. Namely, even in case of a material with a wide particle size distribution, those particles which are relatively small in diameter and readily heated are entrained in the gas stream at a relatively high speed and heated in a shorter time, whilst those particles which are relatively large in diameter and take a relatively long time to be heated are entrained in the gas stream at a relatively low speed and heated for a longer time. Thus, all the particles are heated uniformly and a uniform expanded food stuff can be obtained.

4. Powdery materials can be treated.

5. Since the pressure-receiving member is essentially a single tube, the structure of said member can be rendered resistive to pressure in a simple manner and further, since the apparatus involves no moving part for transporting a material, for a heating period, the operation, maintenance and control of the apparatus are simple.

6. Automatic control can be attained simply.

7. It is possible to transport a material over a long distance while heating the material.

8. Re-heating and re-circulation of a heating medium are possible.

A preferred embodiment of the present invention will be described hereunder with reference to the drawings, particularly to FIG. 1.

A material which has previously been subjected to a suitable pre-treatment is continuously fed into a material supply hopper 1. The material in the supply hopper 1 is continuously dropped through a chute 3 at a predetermined time interval by means of a rotary feeder 2, to be introduced into solid substance displacing means 5 (of the type described in Japanese Patent application No. 40/71022) having forced discharge means 4 and located between closed containers maintained at different pressures. In this case, the displacing means 5 and the rotary feeder 2 are operatively correlated through a single chain in such a manner that the material is dropped from the rotary feeder when an inlet port 6 of the displacing means is located just at the top of said displacing means.

Where use is made of a superheated steam, a high-pressure steam generated in a boiler 7 is heated in a superheater 8 and the resultant superheated steam leaving the superheater 8 enters a mixer 9 and thence flows through a heating conduit 10.

On the other hand, the material displaced by the displacing means 5 under sealed condition is fed into the mixer 9 against the high pressure of the superheated steam and then entrained in the steam, flowing through the heating conduit 10, in a dispersed condition and transported in said heating conduit while being subjected to a heat treatment. In this case, the heating time (or retention time) of the material may optionally be changed by changing the length of the conduit 10 or the velocity of the steam flowing in said conduit. The material heated for a predetermined time in the heating conduit while being entrained in the flow of steam enters a cyclone 11, wherein it is separated from the steam and then abruptly discharged into an expansion tank 13, maintained at the atmospheric pressure, by means of another displacing means 12 having the same construction as that of the aforesaid displacing means 5, whereby the material is expanded. On the other hand, the superheated steam leaving the cyclone 11 from the top thereof is led through a pressure regulating valve 14 to another station where it is used as a heat source (for example, for drying the expanded product or for preheating the material if such be necessary). Alternatively, the used superheated steam is circulated by a compressor (not shown) for reuse. The length of the heating conduit 10 can be determined by the time which is required for heating the material to a temperature at which the material acquires an amount of heat sufficient for expansion, and the velocity at which the material moves in the conduit along with the superheated steam.

The mixer 9, the heating conduit 10 and the cyclone 11 are heated by the exhaust gases of the superheater 8, which gases are circulated through a heating jacket 15 and discharged therefrom through an exhaust port 16 under suction.

Figure 2:
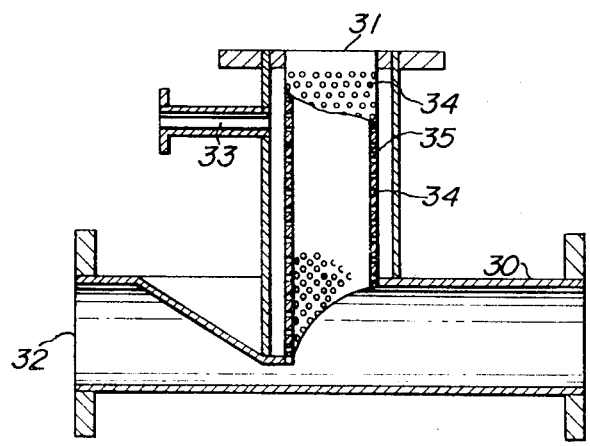

Referring to FIG. 2 there is shown a mixer 30 by which sticky materials, such as polished rice, are mixed in the superheated steam flow and which is used in place of the mixer 9 shown in FIG. 1. The mixer has a material inlet port 31, a heating superheated steam inlet port 32 and another superheated steam inlet port 33. Interior of the material inlet port 31 is disposed a perforated inner cylinder 35 having a large number of apertures 34 formed over the entire surface thereof. The superheated steam admitted in the mixer through the inlet port 33 fills an annular space between the inner wall of the material inlet port 31 and the outer wall of the perforated inner cylinder 35, and sucked into the interior of said perforated inner cylinder through the apertures 34 formed therein. Therefore, the material interior of the perforated inner cylinder 35 is blown radially inwardly of said inner cylinder by the steam jetting inwardly through the apertures 34 and thereby prevented from adhering to the inner surface of said inner cylinder 35. Occasionally, a whole superheated steam required may be introduced into the mixer through the inlet port 33.

Now, examples of the expanding operation conducted by the present inventors using the apparatus of this invention will be illustrated hereinafter:

Example 1

| Material: | polished rice (with or without rice-bran) | bulk density | 1000 kg/m³ |
| --- | --- | --- | --- |
| | | water content | 14.5–15% |
| Heating medium: superheated steam | | | |
| | | pressure | 6 kg/cm²G |
| | | temperature (at heating conduit inlet) | 250°C. |
| | | temperature (at heating conduit outlet) | 200°C. |
| | | steam velocity | 25 m/sec. |
| Material treating capacity (on a continuous basis): | | | 1000 kg/hr. |
| Treatment time (retention time): | | | 6 sec. |
| Properties of the product: | | water content | 8% |
| | | bulk density | 100 kg/m³ |
| | | conversion to α starch | 98% |

Example 2

| Material: | wheat | Bulk density | 780 Kg/m³ |
| --- | --- | --- | --- |
| | | water content | 13.5–14.5% |
| Heating medium: superheated steam | | | |
| | | pressure | 7 kg/cm²G |
| | | temperature (at heating conduit inlet) | 280°C. |
| | | temperature (at heating conduit outlet) | 220°C. |
| | | steam velocity | 20 m/sec. |
| Treating capacity: | | | 1000 kg/hr. |
| Treatment time: | | | 8 sec. |
| Properties of product: | | water content | 10% |
| | | bulk density | 150 kg/m³ |
| | | (Expansion ratio about 5 times) | |
| | | Conversion to α starch | 99% |

Example 3

| Material: | defatted soy bean | bulk density | 450 kg/m³ |
| --- | --- | --- | --- |
| | | Water content | 9.5–10.5% |
| | | particle size distribution | |
| | | 4 mesh or larger | 68.5% |
| | | 4 – 8 mesh | 18.9% |
| | | 8 – 32 mesh | 12.6% |
| Heating medium: superheated steam | | | |
| | | pressure | 5 kg/cm²G |
| | | temperature (at heating conduit inlet) | 250°C. |
| | | temperature (at heating conduit outlet) | 220°C. |
| | | steam velocity | 18 m/sec. |
| Treating capacity (on a continuous basis): | | | 500 kg/hr. |
| Treatment time: | | | 5 sec. |
| Properties of product: | | water content | 4% |

(Note: The protein can be completely denaturated.)

What is claimed is:

1. An apparatus for continuously expanding a food stuff comprising, a source of heated and pressurized gas, a conduit connected at one end to said source for continuously flowing said heated, pressurized gas therethrough, a mixer in communication with said conduit downstream of said gas source in the direction of gas flow for continuously introducing said food stuff into said heated, pressurized gas, and a separating means downstream of said conduit in communication therewith for continuously separating said heated food stuff from said gas and continuously collecting said food stuff, and means in communication with said separating means for abruptly discharging said collected food stuff into air at a lower pressure than said gas, the length of said conduit between said mixer and said separating means and the flow rate of the gas and food stuff through said length being sufficient so that the food stuff introduced at said mixer is fully heated and pressurized by said gas before reaching said separating means.

2. The apparatus of claim 1 further including a means for guiding the gas exiting from said separating means to a place of use for said gas.

* * * * *